US012733036B2

(12) United States Patent
Liu et al.

(10) Patent No.: US 12,733,036 B2
(45) Date of Patent: Sep. 8, 2026

(54) CHANNEL ACCESS PRIORITY CLASS TABLE FOR UNLICENSED SIDELINK

(71) Applicant: QUALCOMM Incorporated, San Diego, CA (US)

(72) Inventors: Chih-Hao Liu, San Diego, CA (US); Xiaoxia Zhang, San Diego, CA (US); Qing Li, Princeton Junction, NJ (US); Jing Sun, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 18/464,962

(22) Filed: Sep. 11, 2023

(65) Prior Publication Data

US 2024/0155686 A1 May 9, 2024

Related U.S. Application Data

(60) Provisional application No. 63/422,143, filed on Nov. 3, 2022.

(51) Int. Cl.
*H04W 74/0816* (2024.01)
*H04W 74/08* (2009.01)
*H04W 92/18* (2009.01)

(52) U.S. Cl.
CPC ... *H04W 74/0816* (2013.01); *H04W 74/0866* (2013.01); *H04W 92/18* (2013.01)

(58) Field of Classification Search
CPC ......... H04W 74/0816; H04W 74/0866; H04W 92/18
See application file for complete search history.

(56) References Cited

U.S. PATENT DOCUMENTS

2020/0045738 A1* 2/2020 Oh .................... H04W 72/1263
2021/0352688 A1* 11/2021 Luo .................. H04W 72/1268
2022/0046696 A1* 2/2022 Park .................... H04L 27/2607
2023/0132437 A1* 5/2023 Lei ........................ H04L 5/0091
370/329

(Continued)

OTHER PUBLICATIONS

3GPP TS 37.213: "3rd Generation Partnership Project, Technical Specification Group Radio Access Network, Physical Layer Procedures for Shared Spectrum Channel Access (Release 17)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V17.3.0, Sep. 21, 2022, pp. 1-39, XP052210876, Paragraphs [0004]-[4.1.1], Figures 4.1.1-1 Paragraph [04.2], Figures 4.2.1-1.

(Continued)

*Primary Examiner* — Ajay Cattungal
(74) *Attorney, Agent, or Firm* — Loza & Loza, LLP

(57) ABSTRACT

Aspects relate to selection of a channel access priority class (CAPC) table for a sidelink channel access procedure on an unlicensed carrier in a sidelink network. A wireless communication device (e.g., a UE or sidelink device) may select between a downlink CAPC table and an uplink CAPC table based on at least one of a sidelink mode, a role of the wireless communication device in the sidelink network, a cast type of sidelink traffic to be transmitted by the wireless communication device, or a channel type of the sidelink traffic.

30 Claims, 12 Drawing Sheets

(56) References Cited

U.S. PATENT DOCUMENTS

2025/0294608 A1 * 9/2025 Hwang ................. H04L 5/0007

OTHER PUBLICATIONS

International Search Report and Written Opinion—PCT/US2023/073970—ISA/EPO—Dec. 6, 2023.

Moderator (OPPO): "FL Summary #1 for AI 9.4.1.1: SL-U Channel Access Mechanism", 3GPP TSG RAN WG1 #110, R1-2207789 (R1-2207790), 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 28, 2022, 67 Pages, XP052275714, Paragraphs [0001]-[0002] Paragraph [04.3].

Moderator (OPPO): "FL Summary #5 for AI 9.4.1.1: SL-U Channel Access Mechanism", 3GPP TSG RAN WG1 #110bis-e, R1-2210709, 3rd Generation Partnership Project, Mobile Competence Centre, 650, Route Des Lucioles, F-06921 Sophia-Antipolis Cedex, France, vol. RAN WG1, No. Electronics, Oct. 10, 2022-Oct. 19, 2022, Oct. 20, 2022, 151 Pages, XP052260172, p. 22, "Cable Labs", p. 15, Last para before itemized list at the bottom, Paragraphs [0001]-[0002] Paragraph [03.2] Paragraph [04.2] Paragraph [3.1.3].

* cited by examiner 100
114
104
106
108
102
110
112
RRH 116
118
120
122
124
126
127
128
130
132
134
136
137
138
140
142

500

Channel Access Priority Class Table for Downlink

| Channel Access Priority Class ($p$) (502) | $m_p$ (504) | $CW_{min,p}$ (506) | $CW_{max,p}$ (508) | $T_{mcot,p}$ (510) | Allowed $CW_p$ sizes (512) |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Channel Access Priority Class Table for Uplink

| Channel Access Priority Class ($p$) (602) | $m_p$ (604) | $CW_{min,p}$ (606) | $CW_{max,p}$ (608) | $T_{mcot,p}$ (610) | Allowed $CW_p$ sizes (612) |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

FIG. 6

CHANNEL ACCESS PRIORITY CLASS TABLE FOR UNLICENSED SIDELINK

CROSS-REFERENCE TO RELATED APPLICATIONS

The present Application for Patent claims priority to and the benefit of U.S. Provisional Application No. 63/422,143, filed Nov. 3, 2022, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to mechanisms of selecting a channel access priority class (CAPC) table for sidelink in unlicensed spectrum.

INTRODUCTION

The 5G New Radio (NR) mobile telecommunication systems can provide higher data rates, lower latency, and improved system performance than previous generation systems such as Long Term Evolution (LTE) communication systems. To meet the increasing demand in wireless communications, additional spectrum is needed. However, the amount of licensed spectrum is limited. Therefore, using unlicensed or shared spectrum offers a solution to meet the exponential increase in wireless communication demand. When using an unlicensed carrier, a wireless communication device or a network access node (e.g., a base station) may initiate a channel occupancy time (COT) and utilize a channel access procedure to sense and access the channel prior to any transmission.

Unlicensed spectrum may be utilized for both cellular communications and for sidelink communications. For cellular communications, a cellular network may enable user equipment (UEs) to communicate with one another through signaling with a nearby base station or cell. For sidelink communications, UEs may signal one another directly, rather than via an intermediary base station or cell. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device is disclosed. The wireless communication device includes one or more memories and one or more processors coupled to the one or more memories. The one or more processors are configured to select a channel access priority class (CAPC) table indicating a defer period and a random number of sensing slots for a sidelink channel access procedure on an unlicensed carrier in a sidelink network based on at least one of a sidelink mode, a role of the wireless communication device in the sidelink network, a cast type of sidelink traffic to be transmitted by the wireless communication device, or a channel type of the sidelink traffic. The processor is further configured to perform the sidelink channel access procedure for a sidelink transmission using the selected CAPC table.

Another example provides a method for wireless communication at a wireless communication device. The method includes selecting a channel access priority class (CAPC) table indicating a defer period and a random number of sensing slots for a sidelink channel access procedure on an unlicensed carrier in a sidelink network based on at least one of a sidelink mode, a role of the wireless communication device in the sidelink network, a cast type of sidelink traffic to be transmitted by the wireless communication device, or a channel type of the sidelink traffic. The method further includes performing the sidelink channel access procedure for a sidelink transmission using the selected CAPC table.

Another example provides a wireless communication device including means for selecting a channel access priority class (CAPC) table indicating a defer period and a random number of sensing slots for a sidelink channel access procedure on an unlicensed carrier in a sidelink network based on at least one of a sidelink mode, a role of the wireless communication device in the sidelink network, a cast type of sidelink traffic to be transmitted by the wireless communication device, or a channel type of the sidelink traffic. The wireless communication device further includes means for performing the sidelink channel access procedure for a sidelink transmission using the selected CAPC table.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIG. 5 is a table illustrating an example of a downlink channel access priority class (CAPC) table according to some aspects.

FIG. 6 is a table illustrating an example of an uplink CAPC table according to some aspects.

DETAILED DESCRIPTION

Figure 1:
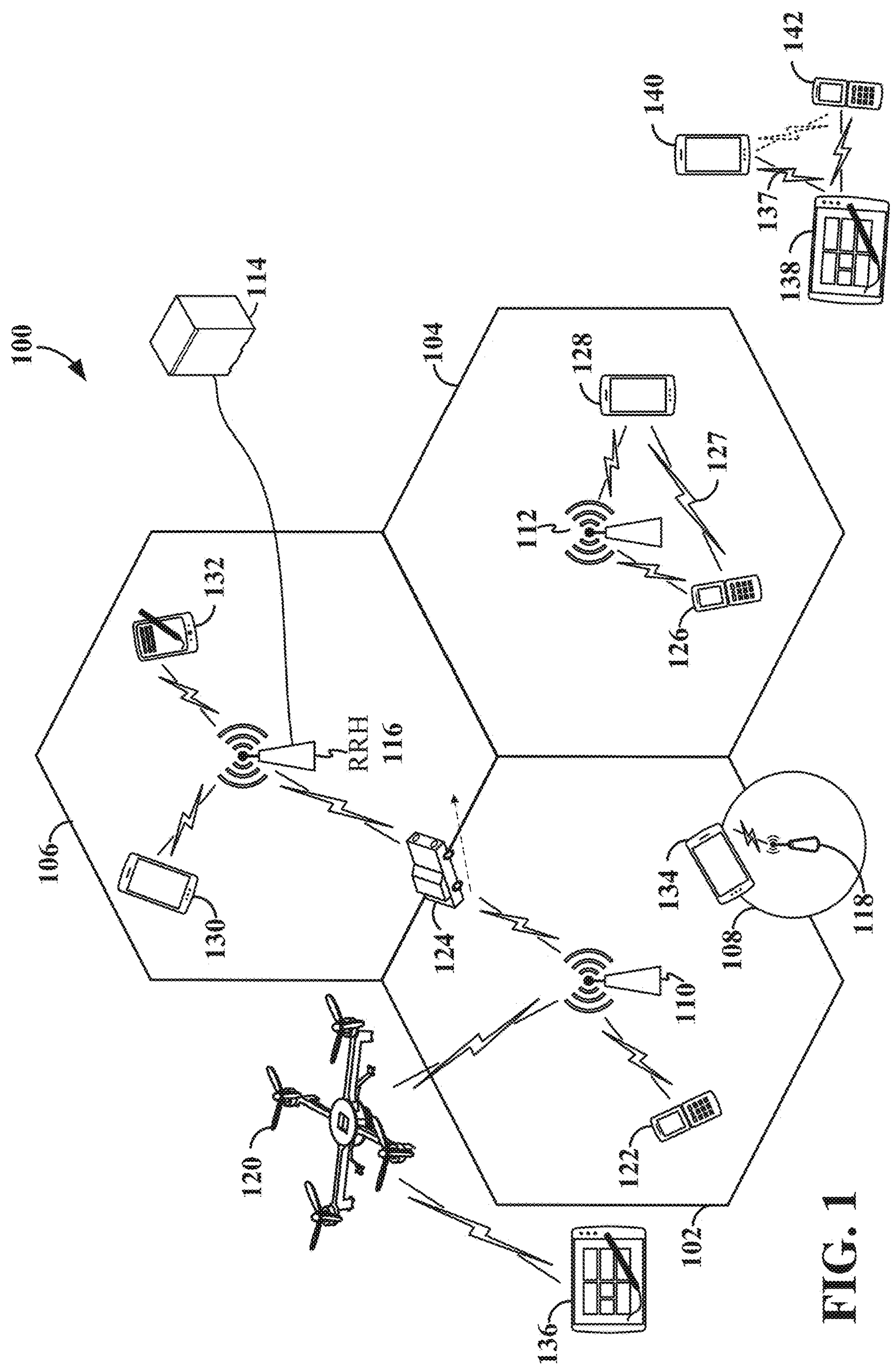
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station or UE), end-user devices, etc. of varying sizes, shapes and constitution.

When using an unlicensed carrier (e.g., New Radio-Unlicensed (NR-U)), a wireless communication device (e.g., a user equipment (UE), a scheduled entity, etc.) or a network entity (e.g., a base station, such as a gNode B (gNB), a transmission and reception point (TRP), a scheduling entity, etc.) may initiate a channel occupancy time (COT) of a channel of the unlicensed carrier. The COT is associated with a COT duration in the time domain and available listen-before-talk (LBT) bandwidths in the frequency domain. To initiate the COT, the wireless communication device or the network entity can use a channel access procedure to sense the channel using, for example, energy detection. After performing the channel access procedure, the wireless communication device or network access node can establish the COT to access the channel for an upcoming transmission (e.g., uplink or downlink transmission).

For example, once the wireless communication device or the network entity senses the channel to be idle during a random number of sensing slots, the wireless communication device or the network entity can then establish the COT. The random number of sensing slots may be selected from a set of possible back-off values that may be determined, for example, from a channel access priority class (CAPC) of the data being sent by the wireless communication device or the network entity. The CAPC of the wireless communication device or the network entity may be identified from a CAPC table. For example, if the network entity is the COT initiating device, the network entity may identify the CAPC from a downlink (DL) CAPC table, whereas if the wireless communication device is the COT initiating device, the wireless communication device may identify the CAPC from an uplink (UL) CAPC table.

For sidelink communications on an unlicensed carrier (e.g., Unlicensed Sidelink (SL-U)), the choice of CAPC table is undefined. Therefore, various aspects relate to selection of a CAPC table for a sidelink channel access procedure on an unlicensed carrier. In some examples, a wireless communication device (e.g., a UE or sidelink device) may select between the DL CAPC table and the UL CAPC table based on at least one of a sidelink mode, a role of the wireless communication device in the sidelink network, a cast type of sidelink traffic to be transmitted by the wireless communication device, or a channel type of the sidelink traffic.

For example, the wireless communication device may select the DL CAPC table when the sidelink mode is Mode 2 and the UL CAPC table when the sidelink mode is Mode 1. As another example, the wireless communication device may select the DL CAPC table when the wireless communication device is one of a SyncRef wireless communication device, an anchor node in the sidelink network, a road side unit (RSU), a sidelink relay node, or a sidelink coordination node configured to coordinate channel access of the unlicensed carrier among a plurality of sidelink nodes or schedule resources among the plurality of sidelink nodes. As another example, the wireless communication device may select the DL CAPC table when the cast type of the sidelink traffic has a high priority (e.g., groupcast or broadcast traffic) and the UL CAPC table when the cast type of the sidelink traffic has a low priority (e.g., unicast traffic). As another example, the wireless communication device may select the DL CAPC table when the channel type of the sidelink traffic has a high priority (e.g., sidelink synchronization signal block (S-SSB) or physical sidelink feedback channel (PSFCH)) and the UL CAPC table when the channel type of the sidelink traffic has a low priority (e.g., physical sidelink control channel (PSCCH) and/or physical sidelink shared channel (PSSCH)). In some examples, the wireless communication device may select between the DL CAPC table and the UL CAPC table based on a respective priority of each of a plurality of channel types of sidelink traffic to be transmitted during the COT.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3*rd* Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is a network element in a radio access network responsible for radio transmission and reception in one or more cells to or from a UE. A network entity may also be referred to by those skilled in the art as a base station (BS), base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the TRPs may be an LTE base station, while another TRP may be a 5G NR base station. In some examples, a network entity may be configured in an aggregated or monolithic base station architecture or in a disaggregated base station architecture.

Various network entity (e.g., base station) arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc.

A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing.

Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
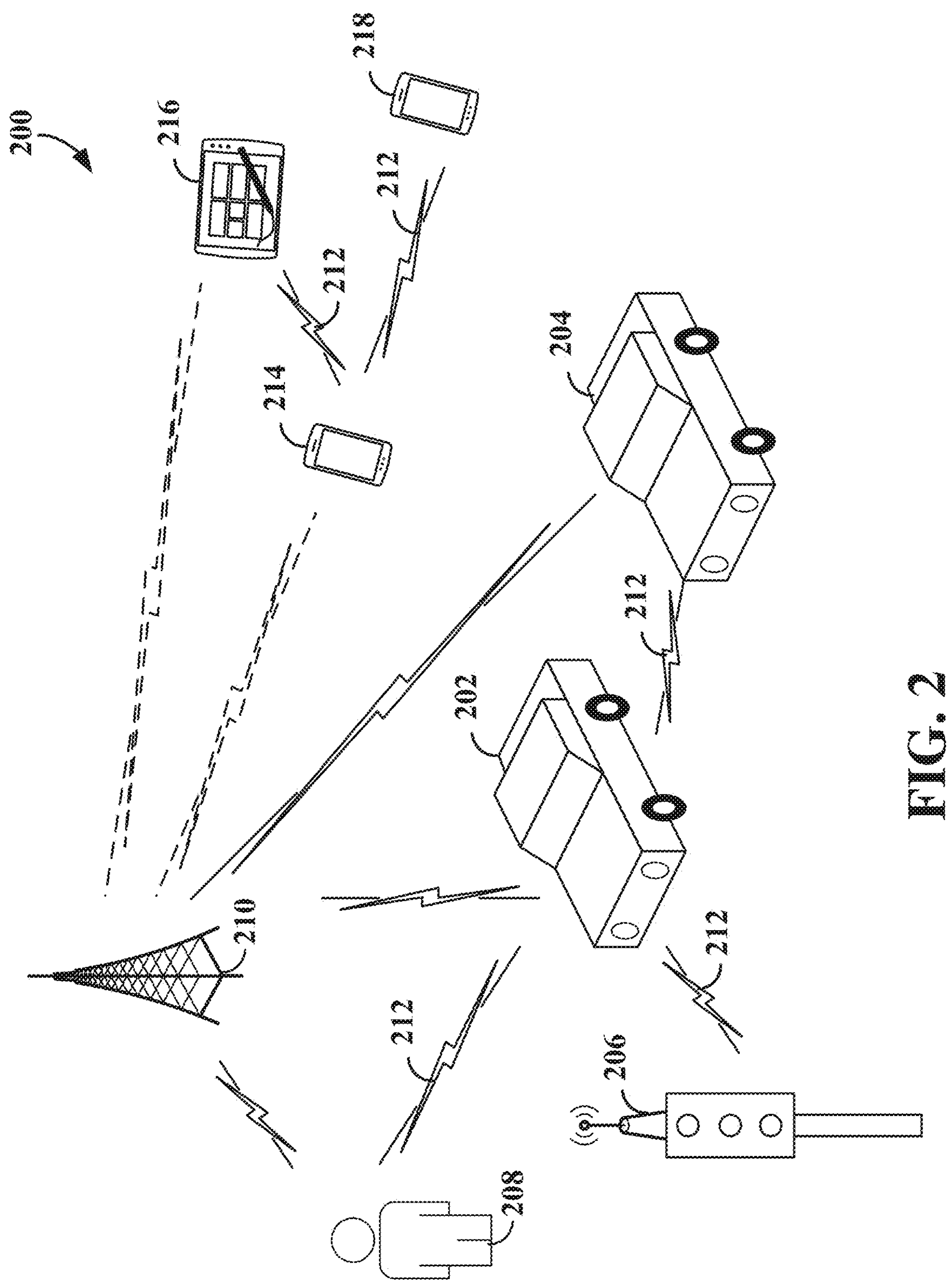
FIG. 2 is a diagram illustrating an example of a frame structure for use in a wireless communication network according to some aspects.

FIG. 2 illustrates an example of a wireless communication network 200 configured to support sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., network entity 210). The network entity 210 may be, for example, any base station (e.g., gNB, eNB) or other scheduling entity as illustrated in FIG. 1. The network entity 210 may further be implemented in an aggregated or monolithic base station architecture, or in a disaggregated base station architecture. In addition, the network entity 210 may be a stationary network entity or a mobile network entity. In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214, 216, and 218.

ProSe communication may support different operational scenarios, such as in-coverage, out-of-coverage, and partial coverage. Out-of-coverage refers to a scenario in which UEs are outside of the coverage area of a network entity (e.g., network entity 210), but each are still configured for ProSe communication. Partial coverage refers to a scenario in which some of the UEs are outside of the coverage area of the network entity 210, while other UEs are in communication with the network entity 210. In-coverage refers to a scenario in which UEs are in communication with the network entity 210 (e.g., gNB) via a Uu (e.g., cellular interface) connection to receive ProSe service authorization and provisioning information to support ProSe operations.

In some examples, a UE (e.g., UE 218) may not have a Uu connection with the network entity 210. In this example, a D2D relay link (over sidelink 212) may be established between UE 218 and UE 214 to relay communication between the UE 218 and the network entity 210. The relay link may utilize decode and forward (DF) relaying, amplify and forward (AF) relaying, or compress and forward (CF) relaying. For DF relaying, HARQ feedback may be provided from the receiving device to the transmitting device. The sidelink communication over the relay link may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications. NR-U operates in the 5 GHz and 6 GHz frequency bands and supports both standalone and licensed-assisted operation based on carrier aggregation and dual connectivity with either NR or LTE in the licensed spectrum. The relay link between UE 214 and UE 218 may be established due to, for example, distance or signal blocking between the network entity 210 and the UE 218, weak receiving capability of the UE 218, low transmission power of the UE 218, limited battery capacity of the UE 218, and/or to improve link diversity. Thus, the relay link may enable communication between the network entity 210 and UE 218 to be relayed via one or more relay UEs (e.g., UE 214) over a Uu wireless communication link and relay link(s) (e.g., between UE 214 and UE 218). In other examples, a relay link may enable sidelink communication to be relayed between a UE (e.g., UE 218) and another UE (e.g., UE 216) over various relay links (e.g., relay links between UEs 214 and 216 and between UEs 214 and 218).

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In some examples, a common carrier may be shared between the sidelinks 212 and Uu links, such that resources on the common carrier may be allocated for both sidelink communication between UEs (e.g., UEs 202, 204, 206, 208, 214, 216, and 218) and cellular communication (e.g., uplink and downlink communication) between the UEs (e.g., UEs 202, 204, 206, 208, 214, 216, and 218) and the network entity 210. In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a network entity (e.g., network entity 210).

In addition, there may be two main resource allocation modes of operation for sidelink (e.g., PC5) communications. In a first mode, Mode 1, a network entity (e.g., gNB) 210 may allocate resources to sidelink devices (e.g., V2X devices or other sidelink devices) for sidelink communication between the sidelink devices in various manners. For example, the network entity 210 may allocate sidelink resources dynamically (e.g., a dynamic grant) to sidelink devices, in response to requests for sidelink resources from the sidelink devices. For example, the network entity 210 may schedule the sidelink communication via DCI 3_0. In some examples, the network entity 210 may schedule the PSCCH/PSSCH within uplink resources indicated in DCI 3_0. The network entity 210 may further activate preconfigured sidelink grants (e.g., configured grants) for sidelink communication among the sidelink devices. In some examples, the network entity 210 may activate a configured grant (CG) via RRC signaling. In Mode 1, sidelink feedback may be reported back to the network entity 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted within the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of retransmission resources reserved for one or more retransmissions of the sidelink transmission (e.g., the sidelink traffic/data). Thus, the SCI may include a respective PSSCH resource reservation and assignment for one or more retransmissions of the PSSCH. For example, the SCI may include a reservation message indicating the PSSCH resource reservation for the initial sidelink transmission (initial PSSCH) and one or more additional PSSCH resource reservations for one or more retransmissions of the PSSCH.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
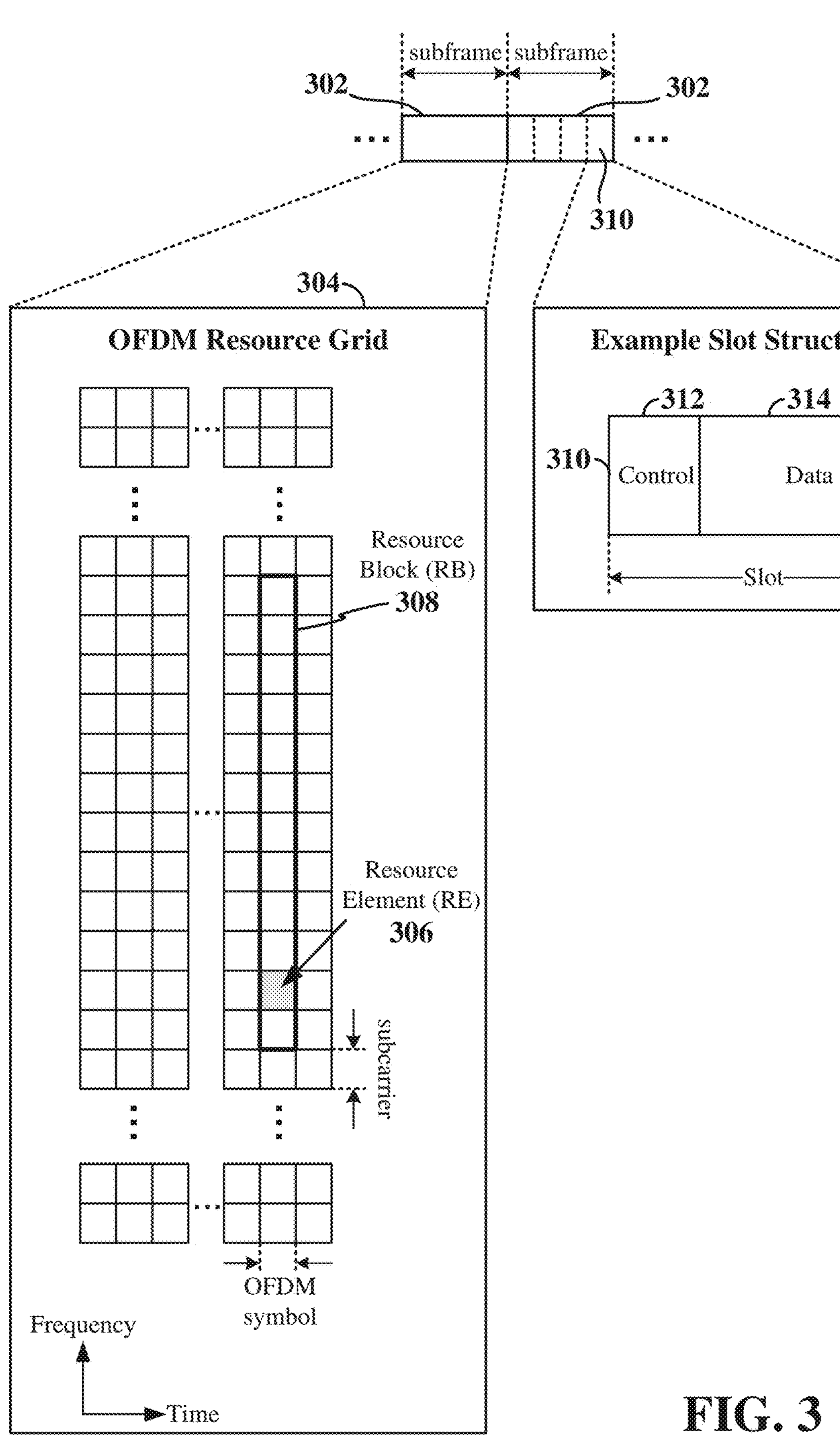
FIG. 3 is a diagram illustrating an example of a wireless communication network employing sidelink communication according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 13 subcarriers, a number independent of the numerology used. In some examples, depending on the numerology, an RB may include any suitable number of consecutive OFDM symbols in the time domain.

A set of continuous or discontinuous resource blocks may be referred to herein as a Resource Block Group (RBG), sub-band, or bandwidth part (BWP). A set of sub-bands or BWPs may span the entire bandwidth. Scheduling of wireless communication devices (e.g., V2X devices, sidelink devices, or other UEs, hereinafter generally referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

Expanded views of slots 310 and 320 each illustrates that the slot 310 includes a control region 312 and a data region 314. In general, the control region 312 may carry control channels, and the data region 314 may carry data channels. In some examples, a Uu slot (e.g., slot 310) may contain all DL, all UL, or at least one DL portion and at least one UL portion. The structures illustrated in FIG. 3 are merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, a slot 310 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a network entity) may allocate one or more REs 306 (e.g., within the control region 312) of the Uu slot 310 to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 306 (e.g., in the control region 312 or the data region 314) of the Uu slot 310 to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 30, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 of the Uu slot 310 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, a measurement report (e.g., a Layer 1 (L1) measurement report), or any other suitable UCI.

In addition to control information, one or more REs 306 (e.g., within the data region 314) of the Uu slot 310 may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIB s, not limited to SIB1, discussed above. For example, the OSI may be provided in these SIBs, e.g., SIB3 and above.

In an example of sidelink communication over a sidelink carrier via a PC5 interface, the control region 312 of the sidelink slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, sidelink MAC-CEs may be transmitted in the data region 314 of the slot 310. In addition, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In some examples, a contiguous set of resource blocks (e.g., RBs 308) may be used to form a channel between a network entity and a UE or between UEs (e.g., for sidelink communication). A New Radio-Unlicensed (NR-U) network can use a channel access procedure to enable wireless devices (e.g., network entities and UEs) to access a channel within a shared/unlicensed spectrum. For example, NR-U may allow for up to 400 MHz and 100 MHz of channel bandwidth in the DL and UL, respectively. An example of a channel access procedure for NR-U is a procedure based on channel sensing that evaluates the availability (e.g., idle or busy) of a channel for performing transmissions. The basic unit for sensing is a sensing slot (e.g., 9 μs slot) with a predetermined duration. In one example, a wireless device (e.g., network entity or UE) can detect the energy of signals transmitted by other devices (e.g., via a received signal strength indication (RSSI)) for a predetermined interval (e.g., 4 μs) within a sensing slot. The sensing slot is considered to be idle when the sensed energy is less than a certain energy detection (ED) threshold; otherwise, the sensing slot is considered to be busy (i.e., not available).

After performing a channel access procedure, a wireless device (e.g., network entity or UE) may establish a channel occupancy time (COT), which refers to the total time for which the wireless device and at least one other device sharing the COT can perform transmission(s) on the channel. In one example, a network entity and a UE can share a COT for UL and DL transmissions between the network entity and the UE. In an aspect, transmission gaps between transmissions may be counted in the COT if the transmission gaps are less than or equal to a predetermined gap duration (e.g., 25 μs).

A DL transmission burst (DL burst) may be defined as a set of transmissions from a network entity (e.g., base station, eNB, or gNB) without any gaps between transmissions greater than 16 μs. Transmissions from a network entity separated by a gap of more than 16 μs are considered as separate DL transmission bursts. A network entity can perform DL transmission(s) after a gap within a DL transmission burst without sensing the corresponding channel(s) for availability. An UL transmission burst is defined as a set of transmissions from a UE without any gaps greater than 16 μs. A UE can perform UL transmission(s) after a gap within an UL transmission burst without sensing the corresponding channel(s) for availability. Transmissions from a UE separated by a gap of more than 16 μs are considered as separate UL transmission bursts. In other aspects, other suitable time gaps can be used to define a DL transmission burst or UL transmission burst.

Two types of channel access procedures for NR-U are available (e.g., Type 1 and Type 2). Each type of channel access procedure utilizes a different listen-before-talk (LBT) procedure. LBT procedures may involve sensing energy on the channel and comparing the energy to an energy detection (ED) threshold. For example, if the detected energy on the channel is at or below the ED threshold level (e.g., indicating that the channel is relatively free of traffic), the wireless device can gain access to the channel for a transmission. For NR-U, there are four LBT categories defined for channel access. Category 1 (Cat 1) LBT specifies that LBT is not used. Category 2 (Cat2) LBT specifies the use of LBT without random back-off. Category 3 (Cat3) LBT specifies the use of LBT with random back-off with a fixed size contention window. Category 4 (Cat4) LBT specifies the use of LBT with random back-off with a variable sized contention window.

In a Type 1 channel access procedure, a wireless device (e.g., network entity or UE) performs a Cat4 LBT, in which the channel access procedure is performed in a time duration spanned by a random number of sensing slots (corresponding to a random back-off) to locate an idle channel before transmission. In a Type 2 channel access procedure, a wireless device (e.g., network entity or UE) performs a Cat1 LBT or Cat2 LBT, in which the channel access procedure is performed in a time duration spanned by a deterministic number of sensing slots to determine an available (e.g., idle) channel before transmission.

Figure 4:
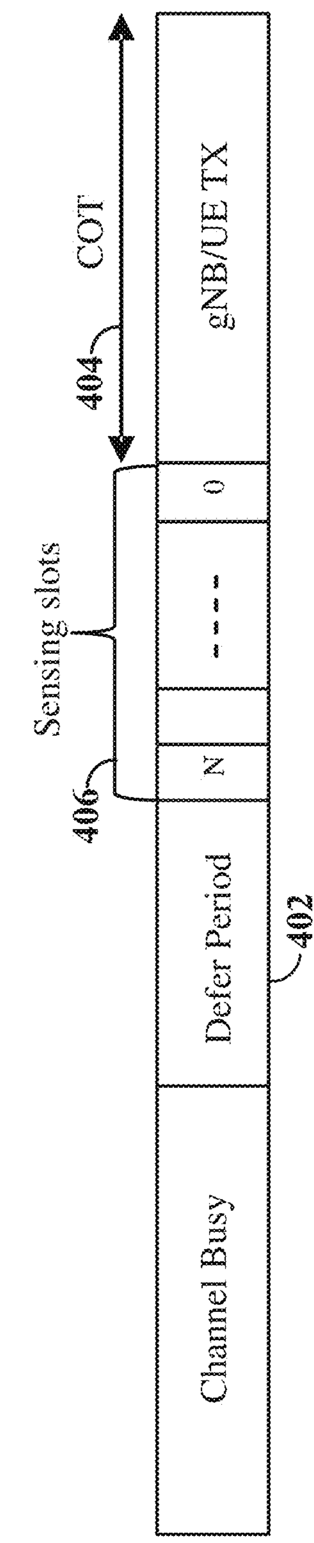
FIG. 4 is a diagram illustrating an example of a Type 1 channel access procedure according to some aspects.

FIG. 4 is a diagram illustrating an example of a Type 1 channel access procedure. After a defer period 402 following a busy channel, a wireless device may transmit (e.g., an UL or DL transmission burst) in a COT 404 after first sensing the channel to be idle during a random number of sensing slots 406 in a defer duration. Thus, Cat4 LBT is used to initiate the COT for DL/UL transmissions within DL/UL transmission bursts. For back-to-back transmissions within a burst, Cat1 LBT may be used. The random number of sensing slots 406 may be selected from a set of possible back-off values (e.g., values within a variable sized contention window). In some examples, the random number of sensing slots 406 may be based on a channel access priority class (CAPC) of the wireless device.

FIG. 5 is a table 500 illustrating an example of a downlink (DL) channel access priority class (CAPC) table according to some aspects of the disclosure. The DL CAPC table 500 includes a plurality of CAPCs (p) 502. Each CAPC (p) 502 has various parameters associated therewith, including a number of consecutive slots m p 504 forming a defer period (e.g., defer period 402 shown in FIG. 4), a maximum contention window CWmax,p 508, a minimum contention window CWmin,p 506, a maximum channel occupancy time Tmcot,p 510, and allowed CWp (e.g., CWmax,p and CWmin,p) sizes 512. These parameters have different values based on the CAPC (p) 502. The wireless device may not transmit on a channel for a COT that exceeds Tmcot,p 510. The random number of sensing slots (e.g., sensing slots 406 shown in FIG. 4) can be based on CWmin,p 506 and CWmax,p 508.

FIG. 6 is a table 600 illustrating an example of an uplink (UL) channel access priority class (CAPC) table according to some aspects of the disclosure. The UL CAPC table 600 includes a plurality of CAPCs (p) 602. Each CAPC (p) 602 has various parameters associated therewith similar to the DL CAPC table 500 shown in FIG. 5. For example, each CAPC 602 includes the following parameters: a number of consecutive slots $m_p$ 604 forming a defer period (e.g., defer period 402 shown in FIG. 4), a maximum contention window CWmax,p 608, a minimum contention window CWmin,p 606, a maximum channel occupancy time Tmcot,p 610, and allowed CWp (e.g., CWmax,p and CWmin,p) sizes 612. These parameters have different values based on the CAPC (p) 602. In addition, these parameters have different values than the corresponding CAPC (p) 502 in the DL CAPC table 500 shown in FIG. 5. In general, the parameters may have larger values in the UL CAPC table 600 to allow for longer average LBT times on the UL.

For Sidelink Unlicensed (SL-U) transmissions between wireless communication devices (e.g., UEs), a separate SL CAPC table for a Type 1 channel access procedure may not be defined. Therefore, in various aspects of the disclosure, a UE initiating a Type 1 channel access procedure may be able to select between the DL CAPC table (e.g., the DL CAPC table 500 shown in FIG. 5) and the UL CAPC table (e.g., the UL CAPC table 600 shown in FIG. 6) based on various factors.

Figure 7:
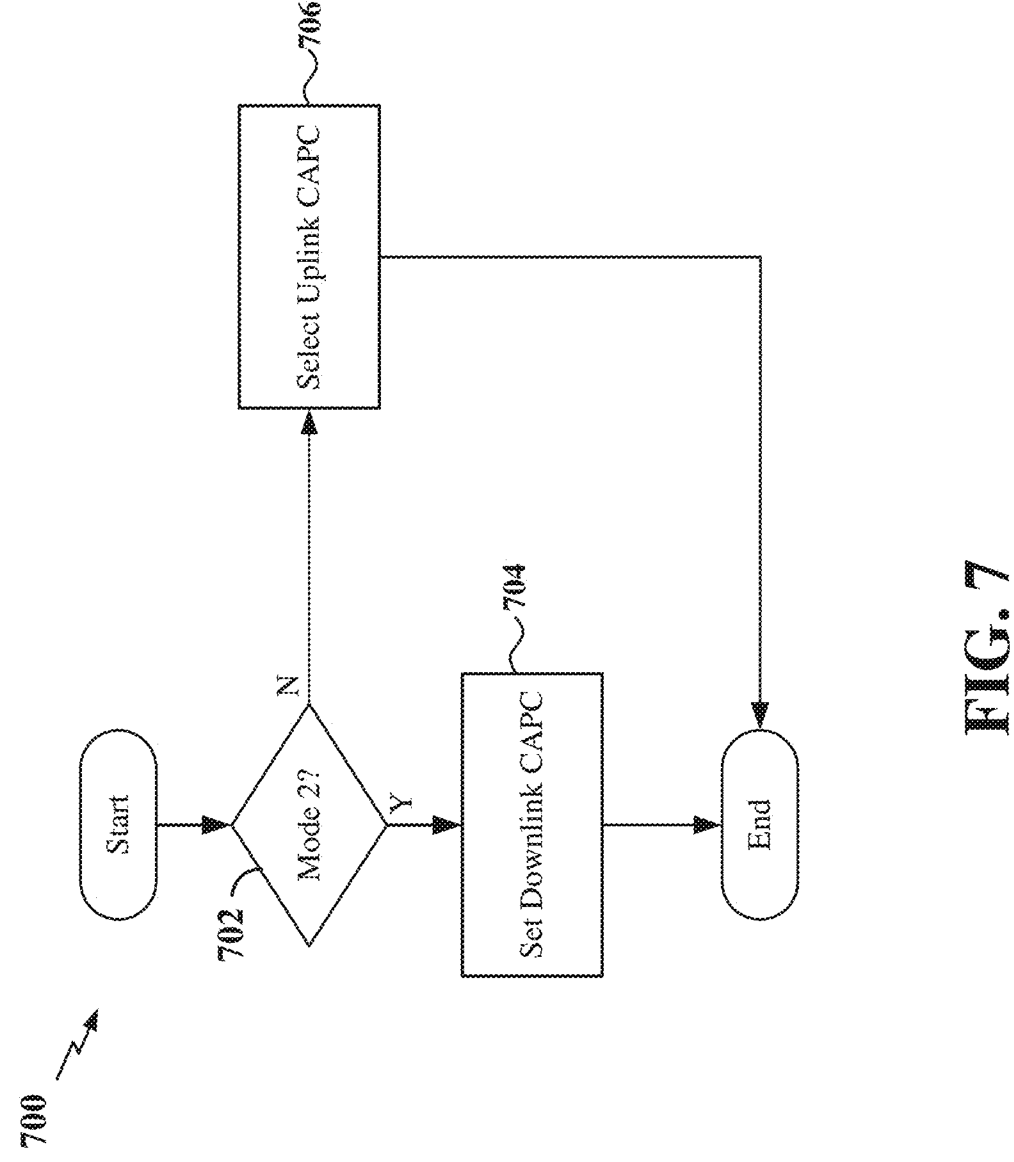
FIG. 7 is a flow chart illustrating an exemplary process for selecting a CAPC table for unlicensed sidelink according to some aspects.

FIG. 7 is a flow chart illustrating an exemplary process 700 for selecting a CAPC table for unlicensed sidelink according to some aspects. As described below, some or all illustrated features may be omitted in a particular implementation within the scope of the present disclosure, and some illustrated features may not be required for implementation of all examples. In some examples, the method may be performed by the wireless communication device 1100, as described below and illustrated in FIG. 11, by a processor or processing system, or by any suitable means for carrying out the described functions.

At block 702, a wireless communication device (e.g., a UE, such as a V2X or other sidelink device) may determine a sidelink mode (e.g., Mode 1 or Mode 2) of the wireless communication device on the unlicensed sidelink carrier. If the wireless communication device is operating in Mode 2 sidelink (Y branch of block 702), at block 704, the wireless communication device may select a downlink CAPC table (e.g., DL CAPC table 500) to perform a sidelink channel access procedure (e.g., a Type 1 channel access procedure) on an unlicensed carrier. For SL-U Mode 2, the wireless communication device (e.g., sidelink transmitting device) performs scheduling of sidelink transmissions. This functionality is similar to the role of the network entity (e.g., scheduling entity or gNB), and as such, the wireless communication device may use the DL CAPC table. Moreover, selection of the DL CAPC table may reduce the LBT time, thus resulting in a faster sidelink transmission time.

If the wireless communication device is operating in Mode 1 (N branch of block 702), at block 706, the wireless communication device may select an uplink CAPC table (e.g., UL CAPC table 600) to perform a sidelink channel access procedure (e.g., a Type 1 channel access procedure). For SL-U Mode 1, the sidelink transmission is scheduled by the network entity grant. This functionality is similar to NR-U uplink transmissions, and as such, the wireless communication device may use the UL CAPC table.

Figure 8:
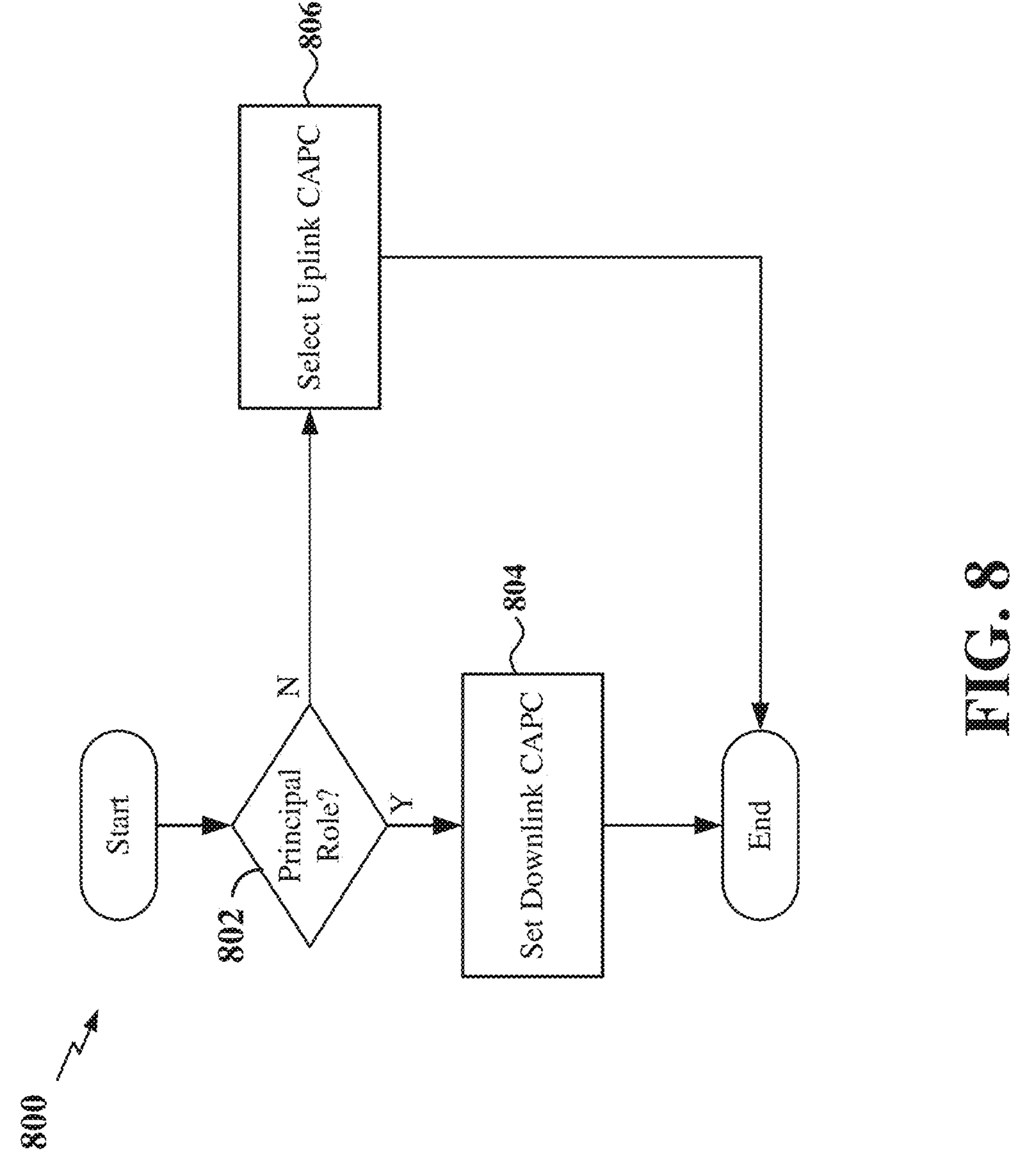
FIG. 8 is a flow chart illustrating another exemplary process for selecting a CAPC table for unlicensed sidelink according to some aspects.

FIG. 8 is a flow chart illustrating another exemplary process 800 for selecting a CAPC table for unlicensed sidelink according to some aspects. As described below, some or all illustrated features may be omitted in a particular implementation within the scope of the present disclosure, and some illustrated features may not be required for implementation of all examples. In some examples, the method may be performed by the wireless communication device 1100, as described below and illustrated in FIG. 11, by a processor or processing system, or by any suitable means for carrying out the described functions.

At block 802, a wireless communication device (e.g., a UE, such as a V2X or other sidelink device) in a sidelink network may determine a role of the wireless communication device in the sidelink network. If the role of the wireless communication is a principal role (Y branch of block 802), at block 804, the wireless communication device may select a downlink CAPC table (e.g., DL CAPC table 500) to perform a sidelink channel access procedure (e.g., a Type 1 channel access procedure) on an unlicensed carrier. Examples of principal roles may include, but are not limited to, a SyncRef wireless communication device (e.g., a UE that transmits sidelink synchronization signals within, for example, an S-SSB), an anchor node in the sidelink network (e.g., a wireless communication device that serves as a hub of sidelink communication in the sidelink network), a road side unit (RSU), a sidelink relay node, or a sidelink coordination node configured to coordinate channel access of the unlicensed carrier among a plurality of sidelink nodes (e.g., wireless communication devices, such as UEs, V2X devices, or other sidelink devices) or schedule resources among the plurality of sidelink nodes. In some examples, a sidelink coordination node may be configured to operate as a COT initiator that assigns COT sharing regions to multiple wireless communication devices (e.g., UEs) or a node that schedules reverse link transmissions (e.g., sidelink transmissions from another wireless communication device to the wireless communication device).

If the role of the wireless communication device is not a principal role (N branch of block 802), at block 806, the wireless communication device may select an uplink CAPC table (e.g., UL CAPC table 600) to perform a sidelink channel access procedure (e.g., a Type 1 channel access procedure).

Figure 9:
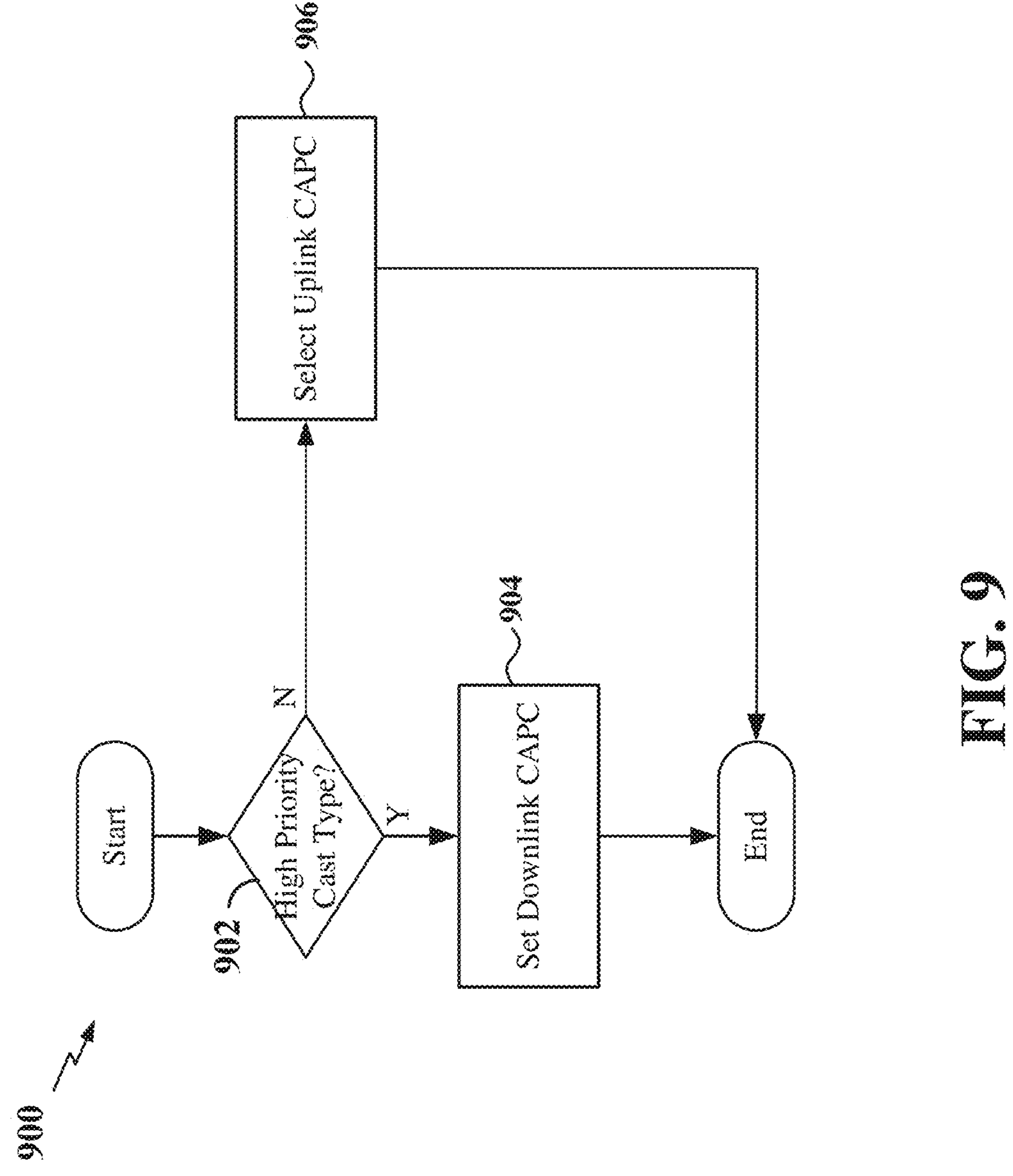
FIG. 9 is a flow chart illustrating another exemplary process for selecting a CAPC table for unlicensed sidelink according to some aspects.

FIG. 9 is a flow chart illustrating another exemplary process 900 for selecting a CAPC table for unlicensed sidelink according to some aspects. As described below, some or all illustrated features may be omitted in a particular implementation within the scope of the present disclosure, and some illustrated features may not be required for implementation of all examples. In some examples, the method may be performed by the wireless communication device 1100, as described below and illustrated in FIG. 11, by a processor or processing system, or by any suitable means for carrying out the described functions.

At block 902, a wireless communication device (e.g., a UE, such as a V2X or other sidelink device) may determine a cast type (e.g., broadcast, groupcast, or unicast) of sidelink traffic to be transmitted by the wireless communication device within a COT established upon performing a sidelink channel access procedure. Different cast types may have a different priority. For example, groupcast and broadcast sidelink traffic may have a high priority, whereas unicast sidelink traffic may have a lower priority. If the cast type is a high priority cast type (e.g., broadcast or groupcast sidelink traffic), corresponding to the Y branch of block 902, at block 904, the wireless communication device may select a downlink CAPC table (e.g., DL CAPC table 500) to perform a sidelink channel access procedure (e.g., a Type 1 channel access procedure) on an unlicensed carrier. If the cast type is not a high priority cast type (e.g., unicast sidelink traffic), corresponding to the N branch of block 902, at block 906, the wireless communication device may select an uplink CAPC table (e.g., UL CAPC table 600) to perform a sidelink channel access procedure (e.g., a Type 1 channel access procedure). In this example, regardless of the CAPC table selected, the CAPC value selected (e.g., 1, 2, 3, or 4) for a COT may depend on the priority of the data to be transmitted during the COT.

Figure 10:
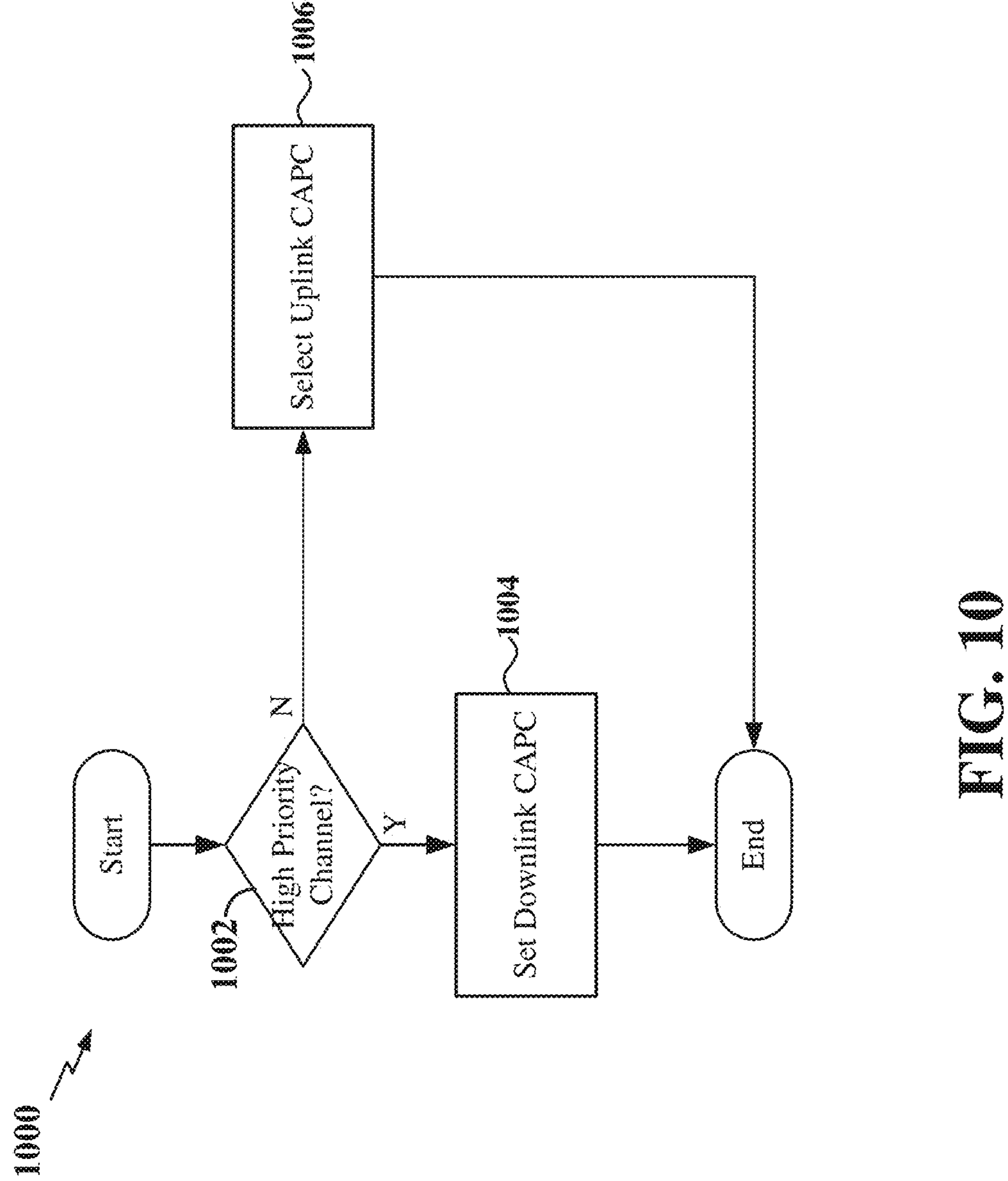
FIG. 10 is a flow chart illustrating another exemplary process for selecting a CAPC table for unlicensed sidelink according to some aspects.

FIG. 10 is a flow chart illustrating another exemplary process 1000 for selecting a CAPC table for unlicensed sidelink according to some aspects. As described below, some or all illustrated features may be omitted in a particular implementation within the scope of the present disclosure, and some illustrated features may not be required for implementation of all examples. In some examples, the method may be performed by the wireless communication device 1100, as described below and illustrated in FIG. 11, by a processor or processing system, or by any suitable means for carrying out the described functions.

At block 1002, a wireless communication device (e.g., a UE, such as a V2X or other sidelink device) may determine a channel type (e.g., S-SSB, PSFCH, PSCCH/PSSCH) of sidelink traffic to be transmitted by the wireless communication device within a COT established upon performing a sidelink channel access procedure. Different channel types may have a different priority. For example, S-SSBs, which provide synchronization signals to all nearby sidelink nodes, and PSFCHs carrying short control signals may have a high priority, whereas PSCCH/PSSCH, which is used for sidelink control/data transmission, may have a lower priority. If the channel type is a high priority channel type (e.g., S-SSB or PSFCH), corresponding to the Y branch of block 1002, at block 1004, the wireless communication device may select a downlink CAPC table (e.g., DL CAPC table 500) to perform a sidelink channel access procedure (e.g., a Type 1 channel access procedure) on an unlicensed carrier. If the cast type is not a high priority cast type (e.g., PSCCH/PSSCH), corresponding to the N branch of block 1002, at block 1006, the wireless communication device may select an uplink CAPC table (e.g., UL CAPC table 600) to perform a sidelink channel access procedure (e.g., a Type 1 channel access procedure).

In examples in which the wireless communication device initiates the COT to carry different channel types or different cast types, the wireless communication device may determine the CAPC table (e.g., DL CAPC table or UL CAPC table) based on either the highest priority channel type/cast type or the lowest priority channel type/cast type. For example, if the wireless communication device establishes the COT to transmit both S-SSB(s) and PSSCH(s) (e.g., PSCCH/PSSCH), the wireless communication device may select the DL CAPC table if the determination is based on the S-SSB (e.g., the highest priority channel type) or the UL CAPC table if the determination is based on the PSCCH (e.g., the lowest priority channel type). As another example, if the wireless communication device establishes the COT to transmit both PSFCH(s) and PSSCH(s) (e.g., PSCCH/PSSCH), the wireless communication device may select the DL CAPC table if the determination is based on the PSFCH (e.g., the highest priority channel type) or the UL CAPC table if the determination is based on the PSSCH (e.g., the lowest priority channel type). It should be understood that regardless of the CAPC table selected, the CAPC value selected (e.g., 1, 2, 3, or 4) for a COT may depend on the priority of the data to be transmitted during the COT.

Figure 11:
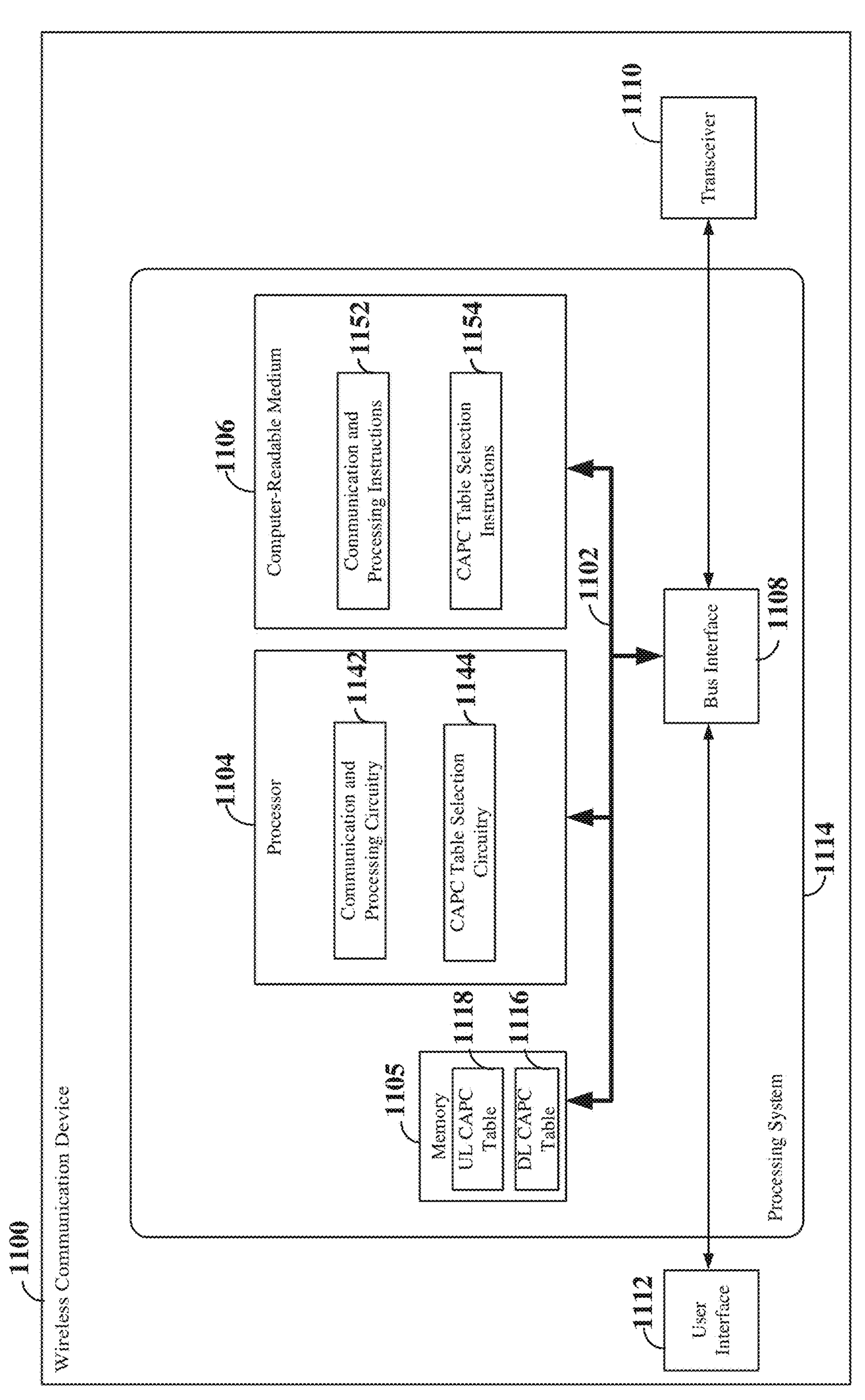
FIG. 11 is a block diagram illustrating an example of a hardware implementation for a wireless communication device employing a processing system according to some aspects.

FIG. 11 is a block diagram illustrating an example of a hardware implementation for a wireless communication device 1100 employing a processing system 1114. For example, the wireless communication device 1100 may correspond to a sidelink (e.g., V2X) device, such as an RSU, V-UE, P-UE, a UE, or other suitable wireless communication device, as shown and described above in reference to FIGS. 1 and/or 2.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in the wireless communication device 1100, may be used to implement any one or more of the processes and procedures described below.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a means for communicating with various other apparatus over a transmission medium (e.g., air interface). Depending upon the nature of the apparatus, a user interface 1112 (e.g., keypad, display, touch screen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1104, causes the processing system 1114 to perform the various functions described below for any particular apparatus.

The computer-readable medium 1106 and the memory 1105 may also be used for storing data that is manipulated by the processor 1104 when executing software. For example, the memory 1105 may store one or more of a DL CAPC table 1116 and an UL CAPC table 1118, which may be used by the processor 1104 in Type 1 sidelink channel access procedures.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with one or more sidelink devices (e.g., other UEs, such as V2X devices) via respective sidelinks (e.g., PC5 interfaces). In addition, the communication and processing circuitry 1142 may be configured to communicate with a network entity (e.g., a base station, such as a gNB or eNB) via a Uu link. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1142 may include one or more transmit/receive chains.

In some implementations where the communication involves receiving information, the communication and processing circuitry 1142 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

The communication and processing circuitry 1142 may be configured to perform, via the transceiver 1110, a sidelink channel access procedure for a sidelink transmission on an unlicensed carrier in a sidelink network. The sidelink channel access procedure may be, for example, a Type 1 channel access procedure. The communication and processing circuitry 1142 may further be configured to establish a channel occupancy time (COT) on the unlicensed carrier following the sidelink channel access procedure. During the COT, the communication and processing circuitry 1142 may further be configured to transmit one or more sidelink transmissions to one or more receiving wireless communication devices and/or receive sidelink transmissions from the one or more receiving wireless communication devices. The communication and processing circuitry 1142 may further be configured to execute communication and processing instructions (software) 1152 stored in the computer-readable medium 1106 to implement one or more of the functions described herein.

The processor 1104 may further include CAPC table selection circuitry 1144, configured to select a CAPC table indicating a defer period and a random number of sensing slots for a sidelink channel access procedure (e.g., a Type 1 channel access procedure) on an unlicensed carrier. In some examples, the CAPC table may be selected from the DL CAPC table 1116 and the UL CAPC table 1118, which may be stored, for example in memory 1105. In some examples, the DL CAPC table 1116 and the UL CAPC table 1118 may be pre-configured on the wireless communication device 1100 by an original equipment manufacturer (OEM) of the wireless communication device 1100 based on one or more New Radio standards or specifications (e.g., NR-U standards or specifications or SL-U standards or specifications).

The CAPC table selection circuitry 1144 may be configured to select the CAPC table based on at least one of a sidelink mode, a role of the wireless communication device 1100 in the sidelink network, a cast type of sidelink traffic to be transmitted by the wireless communication device, or a channel type of the sidelink traffic. For example, the CAPC table selection circuitry 1144 may be configured to select the UL CAPC table 1118 in response to the sidelink mode being Mode 1 and to select the DL CAPC table 1116 in response to the sidelink mode being Mode 2. As another example, the CAPC table selection circuitry 1144 may be configured to select the DL CAPC table in response to the role of the wireless communication device 1100 being one of a SyncRef wireless communication device, an anchor node in the sidelink network, a road side unit (RSU), a sidelink relay node, or a sidelink coordination node configured to coordinate channel access of the unlicensed carrier among a plurality of sidelink nodes or schedule resources among the plurality of sidelink nodes.

In other examples, the CAPC table selection circuitry 1144 may be configured to select the DL CAPC table 1116 in response to the cast type of the sidelink traffic having a high priority and to select the UL CAPC table 1118 in response to the cast type of the sidelink traffic having a low priority. For example, the CAPC table selection circuitry 1144 may be configured to select the DL CAPC table 1116 in response to the cast type of the sidelink traffic being groupcast or broadcast and to select the UL CAPC table 1118 in response to the cast type of the sidelink traffic being unicast.

In other examples, the CAPC table selection circuitry 1144 may be configured to select the DL CAPC table 1116 in response to the channel type of the sidelink traffic having a high priority and to select the UL CAPC table 1118 in response to the channel type of the sidelink traffic having a low priority. For example, the CAPC table selection circuitry 1144 may be configured to select the DL CAPC table 1116 in response to the channel type of the sidelink traffic being a sidelink synchronization signal block (S-SSB), to select the DL CAPC table 1116 in response to the channel type of the sidelink traffic being a physical sidelink feedback channel (PSFCH), and to select the UL CAPC table 1118 in response to the channel type of the sidelink traffic being one or more of a physical sidelink control channel (PSCCH) or a physical sidelink shared channel (PSSCH).

In other examples, the CAPC table selection circuitry 1144 may be configured to select one of the DL CAPC table 1116 or the UL CAPC table 1118 based on a respective priority of each of a plurality of channel types of sidelink traffic to be transmitted during a channel occupancy time (COT) following the sidelink channel access procedure. For example, the CAPC table selection circuitry 1144 may be configured to select one of the DL CAPC table 1116 or the UL CAPC table 1118 in response to the plurality of channel types including an S-SSB and a PSSCH. In this example, the CAPC table selection circuitry 1144 may select the DL CAPC table 1116 based on the S-SSB or may select the UL CAPC table 1118 based on the PSSCH. As another example, the CAPC table selection circuitry 1144 may select one of the DL CAPC table 1116 or the UL CAPC table 1118 in response to the plurality of channel types including a PSFCH and a PSSCH. In this example, the CAPC table selection circuitry 1144 may be configured to select the DL CAPC table 1116 based on the PSFCH or the UL CAPC table 1118 based on the PSSCH. The CAPC table selection circuitry 1144 may further be configured to execute CAPC table selection instructions (software) 1154 stored in the computer-readable medium 1106 to implement one or more of the functions described herein.

Figure 12:
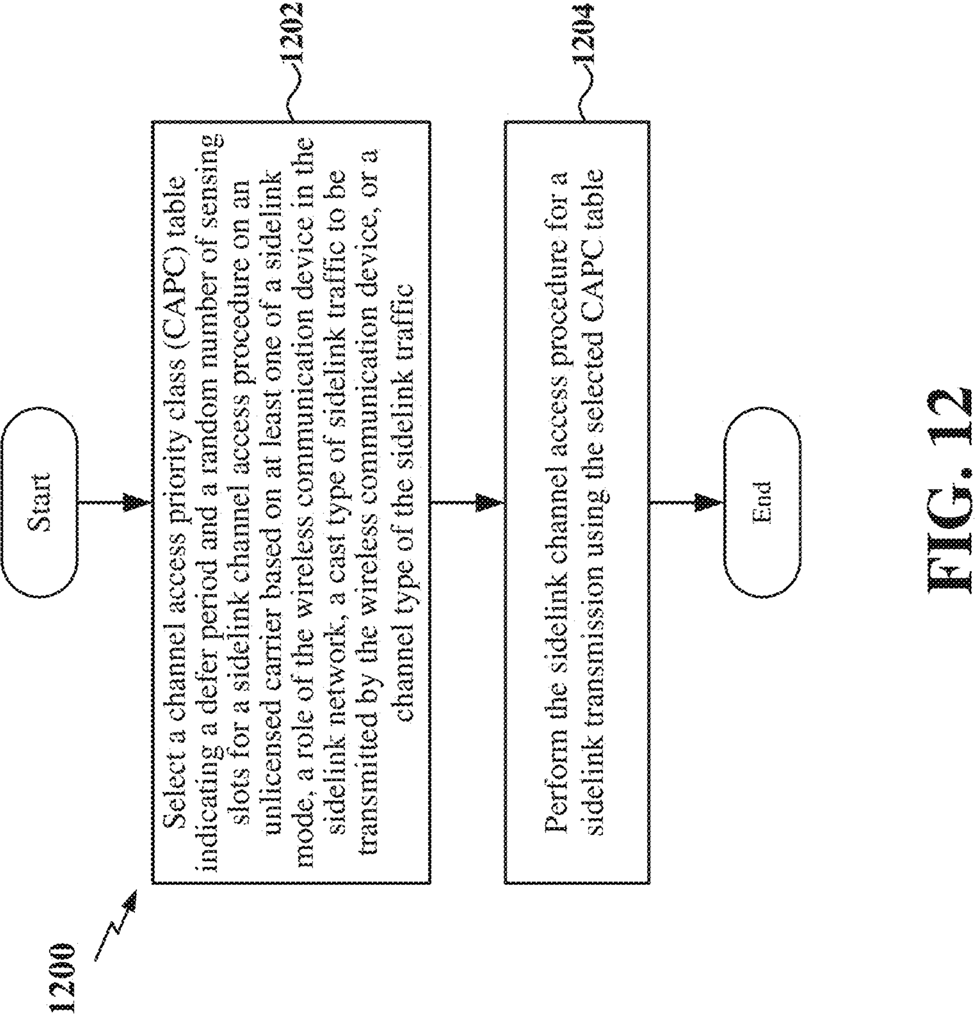
FIG. 12 is a flow chart of an exemplary method for CAPC selection for sidelink communication in unlicensed spectrum according to some aspects.

FIG. 12 is a flow chart of an exemplary method 1200 for CAPC selection for sidelink communication in unlicensed spectrum according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1202, the wireless communication device (e.g., a UE or other sidelink device) may select a channel access priority class (CAPC) table indicating a defer period and a random number of sensing slots for a sidelink channel access procedure on an unlicensed carrier in a sidelink network based on at least one of a sidelink mode, a role of the wireless communication device in the sidelink network, a cast type of sidelink traffic to be transmitted by the wireless communication device, or a channel type of the sidelink traffic. In some examples, the selected CAPC table may be a downlink CAPC table or an uplink CAPC table.

In some examples, the wireless communication device may select the uplink CAPC table in response to the sidelink mode being Mode 1 and may further select the downlink CAPC table in response to the sidelink mode being Mode 2. In some examples, the wireless communication device may select the downlink CAPC table in response to the role of the wireless communication device being one of a SyncRef wireless communication device, an anchor node in the sidelink network, a road side unit (RSU), a sidelink relay node, or a sidelink coordination node configured to coordinate channel access of the unlicensed carrier among a plurality of sidelink nodes or schedule resources among the plurality of sidelink nodes.

In some examples, the wireless communication device may select the downlink CAPC table in response to the cast type of the sidelink traffic having a high priority and may further select the uplink CAPC table in response to the cast type of the sidelink traffic having a low priority. In some examples, the wireless communication device may select the downlink CAPC table in response to the cast type of the sidelink traffic being groupcast or broadcast and may further select the uplink CAPC table in response to the cast type of the sidelink traffic being unicast.

In some examples, the wireless communication device may select the downlink CAPC table in response to the channel type of the sidelink traffic having a high priority and may further select the uplink CAPC table in response to the channel type of the sidelink traffic having a low priority. In some examples, the wireless communication device may select the downlink CAPC table in response to the channel type of the sidelink traffic being a sidelink synchronization signal block (S-SSB), select the downlink CAPC table in response to the channel type of the sidelink traffic being a physical sidelink feedback channel (PSFCH), and select the uplink CAPC table in response to the channel type of the sidelink traffic being one or more of a physical sidelink control channel (PSCCH) or a physical sidelink shared channel (PSSCH).

In some examples, the wireless communication device may select one of the downlink CAPC table or the uplink CAPC table based on a respective priority of each of a plurality of channel types of sidelink traffic to be transmitted during a channel occupancy time (COT) following the sidelink channel access procedure. For example, the wireless communication device may select one of the downlink CAPC table or the uplink CAPC table in response to the plurality of channel types including a sidelink synchronization signal block (S-SSB) and a physical sidelink shared channel (PSSCH). In an example, the wireless communication device may select the downlink CAPC table based on the S-SSB. In another example, the wireless communication device may select the uplink CAPC table based the PSSCH.

In other examples, the wireless communication device may select one of the downlink CAPC table or the uplink CAPC table in response to the plurality of channel types including a physical sidelink feedback channel (PSFCH) and a physical sidelink shared channel (PSSCH). In an example, the wireless communication device may select the downlink CAPC table based on the PSFCH. In another example, the wireless communication device may select the uplink CAPC table based on the PSSCH. For example, the CAPC table selection circuitry 1144, shown and described above in connection with FIG. 11, may provide a means to select the CAPC table.

At block 1204, the wireless communication device may perform the sidelink channel access procedure for a sidelink transmission using the selected CAPC table. For example, the communication and processing circuitry 1142 and transceiver 1110, shown and described above in connection with FIG. 11 may provide a means to perform the sidelink channel access procedure.

In one configuration, the wireless communication device 1100 includes means for selecting a channel access priority class (CAPC) table indicating a defer period and a random number of sensing slots for a sidelink channel access procedure on an unlicensed carrier in a sidelink network based on at least one of a sidelink mode, a role of the wireless communication device in the sidelink network, a cast type of sidelink traffic to be transmitted by the wireless communication device, or a channel type of the sidelink traffic and means for performing the sidelink channel access procedure for a sidelink transmission using the selected CAPC table, as described in the present disclosure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, and/or 11, and utilizing, for example, the processes and/or algorithms described herein in relation to FIGS. 7-10 and/or 12.

The processes shown in FIGS. 7-10 and 12 may include additional aspects, such as any single aspect or any combination of aspects described below and/or in connection with one or more other processes described elsewhere herein.

Aspect 1: A method for wireless communication at a wireless communication device, the method comprising: selecting a channel access priority class (CAPC) table indicating a defer period and a random number of sensing slots for a sidelink channel access procedure on an unlicensed carrier in a sidelink network based on at least one of a sidelink mode, a role of the wireless communication device in the sidelink network, a cast type of sidelink traffic to be transmitted by the wireless communication device, or a channel type of the sidelink traffic; and performing the sidelink channel access procedure for a sidelink transmission using the selected CAPC table.

Aspect 2: The method of aspect 1, wherein the selected CAPC table comprises a downlink CAPC table or an uplink CAPC table.

Aspect 3: The method of aspect 2, wherein the selecting the CAPC table further comprises: selecting the uplink CAPC table in response to the sidelink mode being Mode 1; and selecting the downlink CAPC table in response to the sidelink mode being Mode 2.

Aspect 4: The method of aspect 2, wherein the selecting the CAPC table further comprises: selecting the downlink CAPC table in response to the role of the wireless communication device being one of a SyncRef wireless communication device, an anchor node in the sidelink network, a road side unit (RSU), a sidelink relay node, or a sidelink coordination node configured to coordinate channel access of the unlicensed carrier among a plurality of sidelink nodes or schedule resources among the plurality of sidelink nodes.

Aspect 5: The method of aspect 2, wherein the selecting the CAPC table further comprises: selecting the downlink CAPC table in response to the cast type of the sidelink traffic comprising a high priority; and selecting the uplink CAPC table in response to the cast type of the sidelink traffic comprising a low priority.

Aspect 6: The method of aspect 2 or 5, wherein the selecting the CAPC table further comprises: selecting the downlink CAPC table in response to the cast type of the sidelink traffic comprising groupcast or broadcast; and selecting the uplink CAPC table in response to the cast type of the sidelink traffic comprising unicast.

Aspect 7: The method of aspect 2, wherein the selecting the CAPC table further comprises: selecting the downlink CAPC table in response to the channel type of the sidelink traffic comprising a high priority; and selecting the uplink CAPC table in response to the channel type of the sidelink traffic comprising a low priority.

Aspect 8: The method of aspect 2 or 7, wherein the selecting the CAPC table further comprises: selecting the downlink CAPC table in response to the channel type of the sidelink traffic comprising a sidelink synchronization signal block (S-SSB); selecting the downlink CAPC table in response to the channel type of the sidelink traffic comprising a physical sidelink feedback channel (PSFCH); and selecting the uplink CAPC table in response to the channel type of the sidelink traffic comprising one or more of a physical sidelink control channel (PSCCH) or a physical sidelink shared channel (PSSCH).

Aspect 9: The method of aspect 2, 7, or 8, wherein the selecting the CAPC table further comprises: selecting one of the downlink CAPC table or the uplink CAPC table based on a respective priority of each of a plurality of channel types of sidelink traffic to be transmitted during a channel occupancy time (COT) following the sidelink channel access procedure.

Aspect 10: The method of aspect 9, wherein the selecting one of the downlink CAPC table or the uplink CAPC table further comprises: selecting one of the downlink CAPC table or the uplink CAPC table in response to the plurality of channel types comprising a sidelink synchronization signal block (S-SSB) and a physical sidelink shared channel (PSSCH).

Aspect 11: The method of aspect 10, wherein the selecting one of the downlink CAPC table or the uplink CAPC table in response to the plurality of channel types comprising a sidelink synchronization signal block (S-SSB) and a physical sidelink shared channel (PSSCH) further comprises: selecting the downlink CAPC table based on the S-SSB.

Aspect 12: The method of aspect 10, wherein the selecting one of the downlink CAPC table or the uplink CAPC table in response to the plurality of channel types comprising a sidelink synchronization signal block (S-SSB) and a physical sidelink shared channel (PSSCH) further comprises: selecting the uplink CAPC table based the PSSCH.

Aspect 13: The method of aspect 9, wherein the selecting one of the downlink CAPC table or the uplink CAPC table further comprises: selecting one of the downlink CAPC table or the uplink CAPC table in response to the plurality of channel types comprising a physical sidelink feedback channel (PSFCH) and a physical sidelink shared channel (PSSCH).

Aspect 14: The method of aspect 13, wherein the selecting one of the downlink CAPC table or the uplink CAPC table in response to the plurality of channel types comprising a physical sidelink feedback channel (PSFCH) and a physical sidelink shared channel (PSSCH) further comprises: selecting the downlink CAPC table based on the PSFCH.

Aspect 15: The method of aspect 13, wherein the selecting one of the downlink CAPC table or the uplink CAPC table in response to the plurality of channel types comprising a physical sidelink feedback channel (PSFCH) and a physical sidelink shared channel (PSSCH) further comprises: selecting the uplink CAPC table based on the PSSCH.

Aspect 16: A wireless communication device comprising a transceiver, a memory, and a processor coupled to the transceiver and the memory, the processor configured to perform a method of any one of aspects 1 through 15.

Aspect 17: A wireless communication device comprising means for performing a method of any one of aspects 1 through 15.

Aspect 18: A non-transitory computer-readable medium having stored therein instructions executable by one or more processors of a wireless communication device to perform a method of any one of aspects 1 through 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2 and/or 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless communication device configured for wireless communication, comprising:

one or more memories; and one or more processors coupled to the one or more memories, the one or more processors configured to:

select a channel access priority class (CAPC) table from two or more CAPC tables for a sidelink channel access procedure on an unlicensed carrier in a sidelink network, wherein the CAPC table is selected based on at least one of a sidelink mode, a role of the wireless communication device in the sidelink network, a cast type of sidelink traffic to be transmitted by the wireless communication device, or a channel type of the sidelink traffic, wherein the selected CAPC table indicates a defer period and a random number of sensing slots; and perform the sidelink channel access procedure for a sidelink transmission using the selected CAPC table.

2. The wireless communication device of claim 1, wherein the two or more CAPC tables comprise at least one of a downlink CAPC table or an uplink CAPC table.

3. The wireless communication device of claim 2, wherein the one or more processors are further configured to:

select the uplink CAPC table in response to the sidelink mode being Mode 1; and select the downlink CAPC table in response to the sidelink mode being Mode 2.

4. The wireless communication device of claim 2, wherein the one or more processors are further configured to:

select the downlink CAPC table in response to the role of the wireless communication device being one of a SyncRef wireless communication device, an anchor node in the sidelink network, a road side unit (RSU), a sidelink relay node, or a sidelink coordination node configured to coordinate channel access of the unlicensed carrier among a plurality of sidelink nodes or schedule resources among the plurality of sidelink nodes.

5. The wireless communication device of claim 2, wherein the one or more processors are further configured to:

select the downlink CAPC table in response to the cast type of the sidelink traffic comprising a high priority; and select the uplink CAPC table in response to the cast type of the sidelink traffic comprising a low priority.

6. The wireless communication device of claim 2, wherein the one or more processors are further configured to:

select the downlink CAPC table in response to the cast type of the sidelink traffic comprising groupcast or broadcast; and select the uplink CAPC table in response to the cast type of the sidelink traffic comprising unicast.

7. The wireless communication device of claim 2, wherein the one or more processors are further configured to:

select the downlink CAPC table in response to the channel type of the sidelink traffic comprising a high priority; and select the uplink CAPC table in response to the channel type of the sidelink traffic comprising a low priority.

8. The wireless communication device of claim 2, wherein the one or more processors are further configured to:

select the downlink CAPC table in response to the channel type of the sidelink traffic comprising a sidelink synchronization signal block (S-SSB);

select the downlink CAPC table in response to the channel type of the sidelink traffic comprising a physical sidelink feedback channel (PSFCH); and select the uplink CAPC table in response to the channel type of the sidelink traffic comprising one or more of a physical sidelink control channel (PSCCH) or a physical sidelink shared channel (PSSCH).

9. The wireless communication device of claim 2, wherein the one or more processors are further configured to:

select one of the downlink CAPC table or the uplink CAPC table based on a respective priority of each of a plurality of channel types of sidelink traffic to be transmitted during a channel occupancy time (COT) following the sidelink channel access procedure.

10. The wireless communication device of claim 9, wherein the one or more processors are further configured to:

select one of the downlink CAPC table or the uplink CAPC table in response to the plurality of channel types comprising a sidelink synchronization signal block (S-SSB) and a physical sidelink shared channel (PSSCH).

11. The wireless communication device of claim 10, wherein the one or more processors are further configured to:

select the downlink CAPC table based on the S-SSB.

12. The wireless communication device of claim 10, wherein the one or more processors are further configured to:

select the uplink CAPC table based the PSSCH.

13. The wireless communication device of claim 9, wherein the one or more processors are further configured to:

select one of the downlink CAPC table or the uplink CAPC table in response to the plurality of channel types comprising a physical sidelink feedback channel (PSFCH) and a physical sidelink shared channel (PSSCH).

14. The wireless communication device of claim 13, wherein the one or more processors are further configured to:

select the downlink CAPC table based on the PSFCH.

15. The wireless communication device of claim 13, wherein the one or more processors are further configured to:

select the uplink CAPC table based on the PSSCH.

16. A method for wireless communication at a wireless communication device, the method comprising:

selecting a channel access priority class (CAPC) table from two or more CAPC tables for a sidelink channel access procedure on an unlicensed carrier in a sidelink network, wherein the CAPC table is selected based on at least one of a sidelink mode, a role of the wireless communication device in the sidelink network, a cast type of sidelink traffic to be transmitted by the wireless communication device, or a channel type of the sidelink traffic, wherein the selected CAPC table indicates a defer period and a random number of sensing slots; and performing the sidelink channel access procedure for a sidelink transmission using the selected CAPC table.

17. The method of claim 16, wherein the two or more CAPC tables comprise at least one of a downlink CAPC table or an uplink CAPC table.

18. The method of claim 17, wherein the selecting the CAPC table further comprises:

selecting the uplink CAPC table in response to the sidelink mode being Mode 1; and selecting the downlink CAPC table in response to the sidelink mode being Mode 2.

19. The method of claim 17, wherein the selecting the CAPC table further comprises:

selecting the downlink CAPC table in response to the role of the wireless communication device being one of a SyncRef wireless communication device, an anchor node in the sidelink network, a road side unit (RSU), a sidelink relay node, or a sidelink coordination node configured to coordinate channel access of the unlicensed carrier among a plurality of sidelink nodes or schedule resources among the plurality of sidelink nodes.

20. The method of claim 17, wherein the selecting the CAPC table further comprises:

selecting the downlink CAPC table in response to the cast type of the sidelink traffic comprising a high priority; and selecting the uplink CAPC table in response to the cast type of the sidelink traffic comprising a low priority.

21. The method of claim 17, wherein the selecting the CAPC table further comprises:

selecting the downlink CAPC table in response to the cast type of the sidelink traffic comprising groupcast or broadcast; and selecting the uplink CAPC table in response to the cast type of the sidelink traffic comprising unicast.

22. The method of claim 17, wherein the selecting the CAPC table further comprises:

selecting the downlink CAPC table in response to the channel type of the sidelink traffic comprising a high priority; and selecting the uplink CAPC table in response to the channel type of the sidelink traffic comprising a low priority.

23. The method of claim 17, wherein the selecting the CAPC table further comprises:

selecting the downlink CAPC table in response to the channel type of the sidelink traffic comprising a sidelink synchronization signal block (S-SSB);

selecting the downlink CAPC table in response to the channel type of the sidelink traffic comprising a physical sidelink feedback channel (PSFCH); and selecting the uplink CAPC table in response to the channel type of the sidelink traffic comprising one or more of a physical sidelink control channel (PSCCH) or a physical sidelink shared channel (PSSCH).

24. The method of claim 17, wherein the selecting the CAPC table further comprises:

selecting one of the downlink CAPC table or the uplink CAPC table based on a respective priority of each of a plurality of channel types of sidelink traffic to be transmitted during a channel occupancy time (COT) following the sidelink channel access procedure.

25. A wireless communication device, comprising:

means for selecting a channel access priority class (CAPC) table from two or more CAPC tables for a sidelink channel access procedure on an unlicensed carrier in a sidelink network, wherein the CAPC table is selected based on at least one of a sidelink mode, a role of the wireless communication device in the sidelink network, a cast type of sidelink traffic to be transmitted by the wireless communication device, or a channel type of the sidelink traffic, wherein the selected CAPC table indicates a defer period and a random number of sensing slots; and means for performing the sidelink channel access procedure for a sidelink transmission using the selected CAPC table.

26. The wireless communication device of claim 25, wherein the two or more CAPC tables comprise at least one of a downlink CAPC table or an uplink CAPC table.

27. The wireless communication device of claim 26, wherein the means for selecting the CAPC table further comprises:

means for selecting the uplink CAPC table in response to the sidelink mode being Mode 1; and means for selecting the downlink CAPC table in response to the sidelink mode being Mode 2.

28. The wireless communication device of claim 26, wherein the means selecting the CAPC table further comprises:

means for selecting the downlink CAPC table in response to the role of the wireless communication device being one of a SyncRef wireless communication device, an anchor node in the sidelink network, a road side unit (RSU), a sidelink relay node, or a sidelink coordination node configured to coordinate channel access of the unlicensed carrier among a plurality of sidelink nodes or schedule resources among the plurality of sidelink nodes.

29. The wireless communication device of claim 26, wherein the means for selecting the CAPC table further comprises:

means for selecting the downlink CAPC table in response to the cast type of the sidelink traffic comprising a high priority; and means for selecting the uplink CAPC table in response to the cast type of the sidelink traffic comprising a low priority.

30. The wireless communication device of claim 26, wherein the means for selecting the CAPC table further comprises:

means for selecting the downlink CAPC table in response to the channel type of the sidelink traffic comprising a high priority; and means for selecting the uplink CAPC table in response to the channel type of the sidelink traffic comprising a low priority.

* * * * *